(12) United States Patent
Bao et al.

(10) Patent No.: US 11,347,125 B2
(45) Date of Patent: May 31, 2022

(54) ELECTRONIC PAPER DISPLAY SCREEN AND MANUFACTURING METHOD THEREOF

(71) Applicant: WUXI VISION PEAK TECHNOLOGY CO., LTD, Wuxi (CN)

(72) Inventors: Jin Bao, Wuxi (CN); Lei Zhang, Wuxi (CN); Shan Chen, Wuxi (CN)

(73) Assignee: WUXI VISION PEAK TECHNOLOGY CO., LTD., Wuxi (CN)

( * ) Notice: Subject to any disclaimer, the term of this patent is extended or adjusted under 35 U.S.C. 154(b) by 575 days.

(21) Appl. No.: 16/334,765

(22) PCT Filed: Oct. 10, 2017

(86) PCT No.: PCT/CN2017/105462
§ 371 (c)(1),
(2) Date: Mar. 20, 2019

(87) PCT Pub. No.: WO2019/061555
PCT Pub. Date: Apr. 4, 2019

(65) Prior Publication Data
US 2021/0333680 A1    Oct. 28, 2021

(30) Foreign Application Priority Data
Sep. 26, 2017   (CN) .......................... 201710881471.1

(51) Int. Cl.
*G02F 1/1676*    (2019.01)
*G02F 1/1343*    (2006.01)
(Continued)

(52) U.S. Cl.
CPC ........ *G02F 1/1681* (2019.01); *G02F 1/13439* (2013.01); *G02F 1/167* (2013.01); *G02F 1/1676* (2019.01)

(58) Field of Classification Search
CPC .. G02F 1/167; G02F 1/133305; G02F 1/1345; G02F 2001/1678; G02F 1/136213;
(Continued)

(56) References Cited

U.S. PATENT DOCUMENTS 5,049,978 A * 9/1991 Bates ...................... H01L 23/12
                                                              357/74
8,149,499 B2 * 4/2012 Uchida ................... G02F 1/167
                                                              349/86
(Continued)

FOREIGN PATENT DOCUMENTS

CN        103559841 A    2/2014
CN        103834285 A    6/2014
(Continued)

*Primary Examiner* — Brandi N Thomas
(74) *Attorney, Agent, or Firm* — Bayramoglu Law Offices LLC

(57) ABSTRACT

An electronic paper display screen and a manufacturing method thereof belongs to the field of electronic display. The electronic paper display screen of the present invention eliminates the conventional adhesive layer, and the electrophoretic display layer and the pixel electrode are bonded without the adhesive layer. The electronic paper display screen of the present invention has a simplified production process, a simple display structure, a uniform and controllable thickness of the electrophoretic display layer, and improved display effects. The traditional adhesive layer is removed from the structure of the electronic paper display screen. The present invention is applicable to the electronic paper with a microcapsule or micro-cup structure, wherein
(Continued)

the microcapsule or the micro-cup can include two, three or more kinds of electrophoretic particles having different photoelectric properties.

15 Claims, 2 Drawing Sheets

(51) Int. Cl.
*G02F 1/167* (2019.01)
*G02F 1/1681* (2019.01)

(58) Field of Classification Search
CPC ............... G02F 1/1681; G02F 1/13306; G02F 1/133331; G02F 1/13454; G02F 1/1362; G02F 1/09; G02F 1/1309; G02F 1/133308; G02F 1/133514; G02F 1/16753; G02F 1/16757; G02F 2203/34; G02F 1/094; G02F 1/133302; G02F 1/133351; G02F 1/133562; G02F 1/13452; G02F 1/13458; G02F 1/136227; G02F 1/13624; G02F 1/136254; G02F 1/136259; G02F 1/136263; G02F 1/136272; G02F 1/13629; G02F 1/1677; G02F 2201/42; G02F 2201/50; G02F 1/1333; G02F 1/133314; G02F 1/13338; G02F 1/133524; G02F 1/1368; G02F 1/1675; G02F 1/1676; G02F 1/1685; G02F 2001/094; G02F 2001/133562; G02F 2001/136254; G02F 2201/123; G02F 2202/28; H01L 2924/00014; H01L 2924/12044; H01L 27/124; H01L 27/1255; H01L 2924/00; H01L 27/1214; H01L 2224/05687; H01L 2224/2929; H01L 2224/2939; H01L 2224/29444; H01L 2224/29455; H01L 27/1292; H01L 2924/0002; H01L 2924/15165; H01L 29/66765; H01L 29/78678; H01L 51/0021; H01L 51/0541; H01L 27/3244; H01L 2224/05552; H01L 27/1218; H01L 27/13; H01L 2924/0543; H01L 2924/15153; H01L 29/78621; H01L 21/6835; H01L 2224/0401; H01L 2224/05572; H01L 2224/17107; H01L 2224/24227; H01L 2224/83; H01L 2224/83851; H01L 2224/95085; H01L 23/3114; H01L 27/0207; H01L 27/1222; H01L 27/1244; H01L 27/1248; H01L 27/1259; H01L 27/1266; H01L 2924/01079; H01L 2924/12041; H01L 2924/15155; H01L 2924/19041; H01L 29/0847; H01L 29/41733; H01L 21/02164; H01L 21/0217; H01L 21/02178; H01L 21/02266; H01L 21/02554; H01L 21/02565; H01L 21/02631; H01L 21/02667; H01L 21/428; H01L 21/465; H01L 21/477; H01L 27/1225; H01L 27/1285; H01L 29/04; H01L 29/045; H01L 29/66969; H01L 29/7869; H01L 29/78693; H01L 29/78696; H01L 51/0014; H01L 29/78627; H01L 2924/14; H01L 2924/30105; H01L 2924/3025
See application file for complete search history.

(56) References Cited

U.S. PATENT DOCUMENTS

| | | | |
|---|---|---|---|
| 2006/0103916 | A1 | 5/2006 | Kawai |
| 2015/0168799 | A1* | 6/2015 | Emori .................... G01M 11/30 324/750.01 |

FOREIGN PATENT DOCUMENTS

| | | |
|---|---|---|
| CN | 104317130 A | 1/2015 |
| EP | 3521917 A1 | 8/2019 |
| GB | 2492859 A | 1/2013 |
| KR | 20160126788 A | 11/2016 |

* cited by examiner

ELECTRONIC PAPER DISPLAY SCREEN AND MANUFACTURING METHOD THEREOF

CROSS REFERENCE TO THE RELATED APPLICATIONS

This application is the national phase entry of International Application No. PCT/CN2017/105462, filed on Oct. 10, 2017, which is based upon and claims priority to Chinese Patent Application No. 201710881471.1, filed on Sep. 26, 2017, the entire contents of which are incorporated herein by reference.

TECHNICAL FIELD

The present invention relates to an electronic paper display screen and manufacturing method, which pertains to the technical field of electronic display screen.

BACKGROUND

The electrophoresis display uses the phoresis phenomenon of the charged colloidal particles under the action of an electric field to display the images and words by driving the electrophoretic particles with different photoelectric properties by the electric field. Compared with the display technique in the prior art, the electrophoretic display has the following characteristics: flexible and easy to bend, light, thin, high contrast, low energy consumption, large visual angle, readable under sunlight, image bistable state, and easy mass production, etc.

Electrophoretic display technique was first proposed in the 1970s. The U.S. Pat. No. 3,892,568 discloses a process of preparing an electrophoretic display material containing at least one type of electrophoretic particles. The patent NO. JP1086116 discloses an electrophoretic display system containing at least one type of electrophoretic particles and the electrophoretic liquid is encapsulated with microcapsules. The U.S. Pat. No. 6,930,818 discloses an electrophoretic display unit encapsulated with a micro-cup. The common micro-cup electronic paper display screen mainly includes an upper transparent electrode, a micro-cup electrophoretic display layer, a sealing layer, an adhesive layer, and a pixel electrode. The U.S. Pat. Nos. 5,930,026, 5,961,804, 6,017,584, and 6,120,588 disclose a microencapsulated electrophoretic display unit, wherein the electrophoretic display liquid includes two or more types of electrophoretic particles having different photoelectric properties. The common microcapsule electronic paper display screen mainly includes an upper transparent electrode, a microcapsule electrophoretic display layer, an adhesive layer and a pixel electrode, as shown in FIG. 1 and FIG. 2. In detail, the adhesive layer is mainly used to strengthen the bonding between the pixel electrode layer and the electrophoretic display layer, so as to make the display effect of the electronic paper display screen uniform. However, the use of adhesive layer has obvious negative influence to the electrophoretic display.

1. The distance between the transparent electrode and the pixel electrode is increased, thereby reducing the electric field strength between the electrodes, and reducing the driving force to the electrophoretic particles from the electric field. The influence reflecting on the electrophoretic display effect is the reduced contrast, the increased response time, the over driving voltage, the narrowed application temperature range (0-50° C.) etc. Thus, the applicable condition and product application scope of the electronic paper are seriously restricted.

2. The main constituent of the adhesive layer is polymer resin. In the most conditions, the polymer resin is a good nonconductor and has a high volume resistivity, so the polymer resin cannot be directly used as an adhesive layer of electrophoresis display. Therefore, it is required to add an electrolyte to reduce the volume resistivity. However, the use of electrolyte reduces the service life of the pixel electrode and the electrophoretic display layer.

3. In the process of making the adhesive layer, an adhesive needs to be coated or an adhesive film needs to be laminated on the electrophoretic display layer in advance, which requires preparing the adhesive or the adhesive film and applying the release protective film repeatedly. Due to the complexity of such process, the disqualified products are greatly increased, so the production yield is reduced and the cost is increased.

4. The adhesive layer is prone to absorb the moisture in the environment, and the requirement for sealing the edge of the display screen is strict, which increases the risk of the environmental testing and the production cost, reduces the product yield and the service life of products. Meanwhile, since the adhesive layer absorbs moisture, the display screen will be blurred, thereby reducing the contrast and resolution, and greatly degrading the performance of the product.

SUMMARY

In order to overcome the drawbacks in the prior art, the present invention provides an electronic paper display screen and a manufacturing method thereof, which eliminates the traditional adhesive layer, and simplifies the production process and the structure. Meanwhile, the electronic paper display screen has a better display uniformity and a better performance.

According to the technical solutions provided by the present invention, the electronic paper display screen is characterized in that: the electronic paper display screen includes a transparent electrode substrate, an upper transparent electrode, an electrophoretic display layer, and a pixel electrode, wherein the transparent electrode substrate, the upper transparent electrode, the electrophoretic display layer, and the pixel electrode are sequentially arranged from top to bottom and are sealed by a waterproof adhesive at edges; a conductive silver paste is provided between the upper transparent electrode and the pixel electrode, and the conductive silver paste is electrically connected to the upper transparent electrode and the pixel electrode.

Further, an Integrated Circuit (IC) module is provided on an outside of the waterproof adhesive on the pixel electrode, and the IC module is fixed and sealed by a room temperature vulcanized (RTV) silicone.

Further, the electrophoretic display layer is a single layer microcapsule array, a multilayer microcapsule array, or a single layer micro-cup array.

Further, a microcapsule or a micro-cup includes two, three or more kinds of electrophoretic particles having different photoelectric properties.

Further, the microcapsule has a thickness of 5-150 microns, preferably 15-60 microns; a single microcapsule has a diameter of 5-300 microns, preferably 30-100 microns.

Further, the micro-cup layer has a thickness of 5-180 microns, preferably 15-80 microns; a planar structure of a single micro-cup has a size of 5-300 microns, preferably 30-150 microns.

A method for manufacturing the electronic paper display screen is characterized in that the method includes the following steps:

(1) manufacturing an electronic paper array on a pixel electrode; performing a curing to form an electrophoretic display layer and bond an electrophoretic display layer to the pixel electrode; or directly laminating a cured electrophoretic display layer on the pixel electrode;

(2) dropping and applying a conductive silver paste or a conductive bead on the pixel electrode; and laminating an upper transparent electrode and an transparent electrode substrate on the electrophoretic display layer;

(3) trimming off a corresponding part of the upper transparent electrode and the transparent electrode substrate to expose a predetermined position of an IC module on the pixel electrode; sealing edges by a waterproof adhesive; and curing by ultraviolet light.

Further, the method further includes the step (4): configuring an IC module on the predetermined position exposed on the pixel electrode; and fixing and sealing the IC module with an RTV silicone.

Further, in the step (1), a microcapsule electronic paper array is manufactured by coating, printing, screen printing or filling the electronic paper array, or a micro-cup electronic paper array is manufactured by micro-embossing or plate etching method.

Further, in the step (1), the curing method includes a moisture curing, a photo curing, a pressure sensitivity, a heat curing, a reversible heat curing, or a hot-melt pressure sensitivity.

In the electronic paper display screen of the present invention, the traditional adhesive layer is eliminated, and the electrophoretic display layer is attached to the pixel electrode without the adhesive layer, which simplifies the production process and the display structure, makes the thickness of the electrophoretic display layer uniform and controllable, and improves the display effects etc. The removal of the traditional adhesive layer improves the production efficiency and yield, and improves the display performance at the same time. The present invention is applicable to electronic paper with a microcapsule or micro-cup structure, wherein the microcapsule or the micro-cup includes two, three or more kinds of electrophoretic particles having different photoelectric properties, and can realize a display of black and white, single color, double colors, and multiple colors and true color etc.

Figure 1:
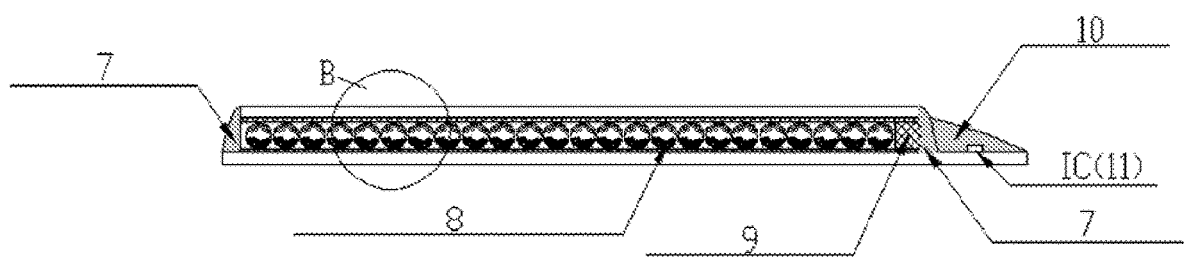
FIG. 1 is a cross-sectional view showing an electronic paper display screen in the prior art.
Figure 2:
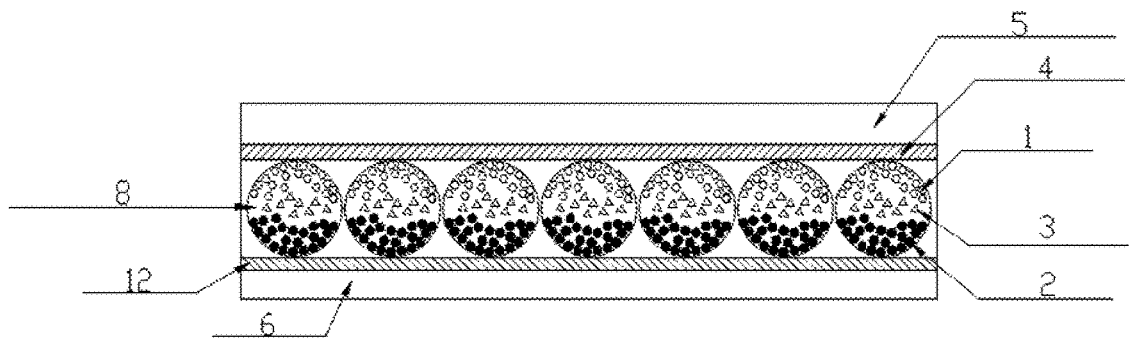
FIG. 2 is a partially enlarged view showing the area B in FIG. 1.

The description of the reference designators in the drawings: 1: white particles, 2: black particles, 3: other particles, 4: upper transparent electrode, 5: transparent electrode substrate, 6: pixel electrode, 7: waterproof adhesive, 8: electrophoretic display layer, 9: conductive silver paste, 10: RTV silicone, 11: IC module, 12: adhesive layer.

DETAILED DESCRIPTION OF THE EMBODIMENTS

The present invention will be further described hereinafter with reference to the specific drawings.

Embodiment 1

Figure 3:
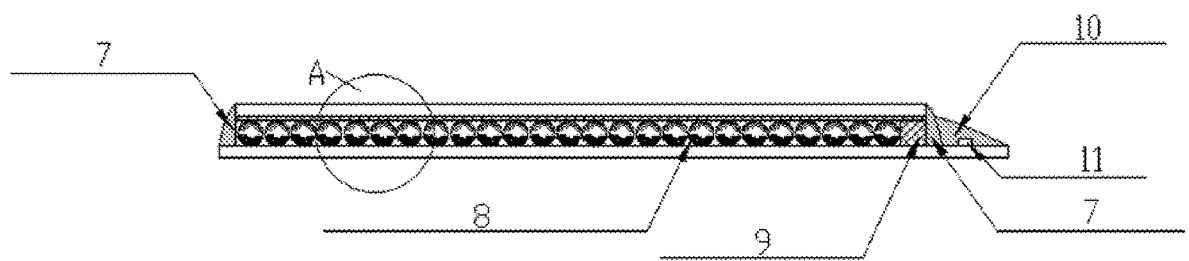
FIG. 3 is a cross-sectional view showing an electronic paper display screen of the present invention.
Figure 4:
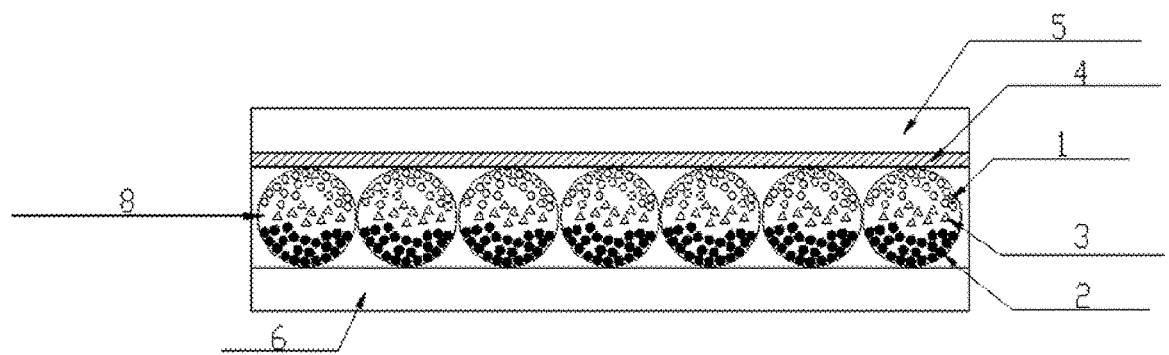
FIG. 4 is a partially enlarged view showing the area A in FIG. 3.

As shown in FIG. 3 and FIG. 4, the electronic paper display screen of the present invention includes a transparent electrode substrate 5, an upper transparent electrode 4, an electrophoretic display layer 8, and a pixel electrode 6 which are sequentially arranged from top to bottom and are sealed by waterproof adhesive 7 on the edges. A conductive silver paste 9 is provided between the upper transparent electrode 4 and the pixel electrode 6, and the conductive silver paste 9 is electrically connected to the upper transparent electrode 4 and the pixel electrode 6. Further, the conductive silver paste 9 may be replaced by conductive beads. An IC module 11 is provided on the outside of the waterproof adhesive 7 on the pixel electrode 6, and the IC module 11 is fixed and sealed by the RTV silicone 10.

The electrophoretic display layer 8 may be a single layer microcapsule array, a multilayer microcapsule array, or a single layer micro-cup array, and preferably, the electrophoretic display layer 8 is the single layer microcapsule array or the single layer micro-cup array. The microcapsule or micro-cup includes two, three or more kinds of electrophoretic particles having different optoelectronic properties, thereby achieving a display of black and white, single color, multiple colors and true color. Preferably, the color of the electrophoretic particles includes white, black, red, green, blue, and yellow etc.

The microcapsule is elastic, deformable, and has a water content less than 5%. The microcapsule has a thickness of 5-150 microns, preferably 15-60 microns. A single microcapsule has a diameter of 5-300 microns, preferably 30-100 microns.

The planar structure of the micro-cup may be hexagon, triangle, diamond, rectangle, circle and the like. The micro-cup layer has a thickness of 5-180 microns, preferably 15-80 microns. The planar structure of the single micro-cup has a size of 5-300 microns, preferably 30-150 microns.

The single layer microcapsule and the single layer micro-cup electrophoretic display layer both have adhesion by its own. This adhesion can be achieved by moisture curing, photo curing, pressure sensitivity, heat curing, hot-melt pressure sensitivity etc. The heat curing is preferably a reversible heat curing method. In the present invention, the electrophoretic display layer is bonded to the pixel electrode by the curing method based on their own adhesion, thereby avoiding many deficiencies caused by using the adhesive layer in the prior art.

Compared with the traditional electronic paper display screen, the contrast is increased by more than 10%, the response time is reduced to less than 80 milliseconds, the driving voltage is reduced to +1.5 V to +3V and −3 V to −1.5V, and the operating temperature range is broadened to −25-70° C.

The microcapsule electronic paper array may be formed by coating, printing, screen printing, filling and the like, and preferably the single layer microcapsule array is formed by One Drop Filling (ODF) mode.

The micro-cup electronic paper array is manufactured by micro-embossing and plate etching method, wherein the micro-cup structure may be prepared by a material of the photo curing or reversible heat curing, and the edge sealing material of the micro-cup may be hot-melt adhesive.

The microcapsule or micro-cup includes two, three or more kinds of electrophoretic particles having different optoelectronic properties, thereby achieving a display of black and white, single color, multiple colors and true color. The color of the electrophoretic particles preferably includes white, black, red, green, blue, and yellow etc.

Embodiment 2: A Method for Manufacturing the Electronic Paper Display Screen As shown in FIG. 3 and FIG. 4, firstly, the multi-particle microcapsule electronic ink is dropped and coated on the pixel electrode 6 by an adhesive dispenser, and a microcapsule electrophoretic display layer 8 is formed by heat curing. The microcapsule includes white particles 1 and black particles 2. Next, a conductive silver paste 9 or conductive beads is/are dropped and coated on the pixel electrode 6, and the upper transparent electrode 4 and the transparent electrode substrate 5 are laminated onto the microcapsule electrophoretic display layer 8. After that, according to the designed drawing, the corresponding parts of the upper transparent electrode 4 and the transparent electrode substrate 5 are trimmed off by laser to expose a predetermined position for binding the IC module 11 on the pixel electrode 6. Then, a waterproof adhesive is dropped and coated by the adhesive dispenser to seal the edges, and the ultraviolet light is emitted to cure the waterproof adhesive. The IC module 11 is configured by the Chip On Glass (COG) process. Finally, the RTV silicone 10 is printed by the RTV silicone process to complete the manufacture of the electronic paper display screen. The pixel electrode 6 includes a segment code and a dot matrix, and is made of glass or plastic. The plastic includes PI, PEN or PET. The multi-particle microcapsule electronic ink includes white particles 1, black particles 2 and other particles 3, so as to achieve a display of black and white, single color, multiple colors and true color. The other particles 3 are usually yellow particles or/and red particles.

In the present embodiment, the curing method of the electrophoretic display layer may be a reversible heat curing method, that is, a reversible process of repeatedly bonding and peeling by heating. The temperature range of bonding and peeling in the reversible heat curing is 60-150° C., preferably 80-120° C. The heating time range is 0-30 minutes, preferably 2-20 minutes, optimally 5-10 minutes. The specific process is as follows:

1. setting the temperature of the heating and laminating equipment to 100° C.; setting the heating time to be 5 minutes when the equipment reaches the set temperature; at this time, aligning and attaching the microcapsule electronic paper film with the Thin Film Transistor (TFT) glass; laminating the glass and the film through the laminating equipment, so that the microcapsule film and the TFT glass are bonded together by heat curing, so that the fully curing and bonding of the display screen is completed until cooling to the room temperature;

2. reheating the cured and bonded display screen to 100° C., and heating for 10 minutes; then slowly and completely peeling off the microcapsule electronic paper film from the surface of the TFT glass by the peeling equipment; after that, cooling to room temperature to obtain an intact microcapsule electronic paper film, so that the microcapsule electronic paper film is recyclable and can be laminated onto the pixel electrode 6 next time if needed.

The advantage of the reversible heat curing is as follows: the electronic paper is recyclable, thereby saving the cost, and is environmental friendly.

Although the present invention has been described above in combination of the embodiments, it is obvious for the person skilled in the art that various modifications can be derived based the above-mentioned embodiments within the scope of the appended claims of the present invention.

What is claimed is:

1. An electronic paper display screen, comprising a transparent electrode substrate, an upper transparent electrode, an electrophoretic display layer, and a pixel electrode wherein the pixel electrode includes a segment code and a dot matrix and is made of glass or plastic, wherein the transparent electrode substrate, the upper transparent electrode, the electrophoretic display layer, and the pixel electrode are sequentially arranged from top to bottom and are sealed by a waterproof adhesive on edges; a conductive silver paste is provided between the upper transparent electrode and the pixel electrode wherein the conductive silver paste is proximal to the waterproof adhesive, and the conductive silver paste is electrically connected to the upper transparent electrode and the pixel electrode.

2. The electronic paper display screen according to claim 1, wherein an IC module is provided on an outside of the waterproof adhesive on the pixel electrode, and is fixed and sealed by an RTV silicone.

3. The electronic paper display screen according to claim 1, wherein the electrophoretic display layer is a single layer microcapsule array, a multilayer microcapsule array, or a single layer micro-cup array.

4. The electronic paper display screen according to claim 3, wherein a microcapsule or a micro-cup comprises two, three or more kinds of electrophoretic particles having different photoelectric properties.

5. The electronic paper display screen according to claim 3, wherein a microcapsule has a thickness of 5-150 microns; a single microcapsule has a diameter of 5-300 microns.

6. The electronic paper display screen according to claim 3, wherein a micro-cup layer has a thickness of 5-180 microns; a planar structure of a single micro-cup has a size of 5-300 microns.

7. A method for manufacturing the electronic paper display screen, comprising the following steps: step (1): manufacturing an electronic paper array on a pixel electrode, wherein the pixel electrode includes a segment code and a dot matrix and is manufactured from glass or plastic, performing a curing to form an electrophoretic display layer, and bonding the electrophoretic display layer to the pixel electrode; or directly laminating the electrophoretic display layer on the pixel electrode; step (2): dropping and coating a conductive silver paste or a conductive bead on the pixel electrode, and laminating an upper transparent electrode and an transparent electrode substrate on the electrophoretic display layer; step (3): trimming off corresponding parts of the upper transparent electrode and transparent electrode substrate to expose a predetermined position of an IC module on the pixel electrode, sealing edges by a waterproof adhesive, and curing by ultraviolet light.

8. The method for manufacturing the electronic paper display screen according to claim 7, wherein the method further comprises step (4), configuring the IC module on the predetermined position exposed on the pixel electrode; and fixing and sealing the IC module with an RTV silicone.

9. The method for manufacturing the electronic paper display screen according to claim 7, wherein in the step (1), a microcapsule electronic paper array is manufactured by coating, printing, screen printing or filling the electronic paper array, or a micro-cup electronic paper array is manufactured by a micro-embossing or a plate etching method.

10. The method for manufacturing the electronic paper display screen according to claim 7, wherein the step (1), the curing comprises a moisture curing, a photo curing, a pressure sensitivity, a heat curing, a reversible heat curing or a hot-melt pressure sensitivity.

11. The electronic paper display screen according to claim 2, wherein the electrophoretic display layer is a single layer microcapsule array, a multilayer microcapsule array, or a single layer micro-cup array.

12. The electronic paper display screen according to claim 11, wherein a microcapsule or a micro-cup comprises two, three or more kinds of electrophoretic particles having different photoelectric properties.

13. The electronic paper display screen according to claim 11, wherein a microcapsule has a thickness of 5-150 microns; a single microcapsule has a diameter of 5-300 microns.

14. The electronic paper display screen according to claim 11, wherein a micro-cup layer has a thickness of 5-180 microns; a planar structure of a single micro-cup has a size of 5-300 microns.

15. The electronic paper display screen according to claim 1, wherein the plastic includes at least one of PI, PEN, or PET.

* * * * *